(12) United States Patent
Yokoyama et al.

(10) Patent No.: US 11,634,559 B2
(45) Date of Patent: Apr. 25, 2023

(54) METHOD FOR PRODUCING RESIN COMPOSITION AND METHOD FOR PRODUCING MOLDED ARTICLE

(71) Applicant: ADEKA CORPORATION, Tokyo (JP)

(72) Inventors: Ryo Yokoyama, Saitama (JP); Hiroki Nishi, Saitama (JP)

(73) Assignee: ADEKA CORPORATION, Tokyo (JP)

(*) Notice: Subject to any disclaimer, the term of this patent is extended or adjusted under 35 U.S.C. 154(b) by 0 days.

(21) Appl. No.: 17/793,528

(22) PCT Filed: Jan. 8, 2021

(86) PCT No.: PCT/JP2021/000530
§ 371 (c)(1),
(2) Date: Jul. 18, 2022

(87) PCT Pub. No.: WO2021/149524
PCT Pub. Date: Jul. 29, 2021

(65) Prior Publication Data
US 2023/0091048 A1  Mar. 23, 2023

(30) Foreign Application Priority Data

Jan. 20, 2020  (JP) .............................. JP2020-006644

(51) Int. Cl.
*C08K 5/527* (2006.01)
*C08K 3/34* (2006.01)
(Continued)

(52) U.S. Cl.
CPC .............. *C08K 5/527* (2013.01); *C08K 3/346* (2013.01); *B29C 48/40* (2019.02); *B29C 48/47* (2019.02); *B29C 48/50* (2019.02)

(58) Field of Classification Search
None
See application file for complete search history.

(56) References Cited

U.S. PATENT DOCUMENTS 10,882,974 B2  1/2021  Fukuda et al.
2019/0112403 A1  4/2019  Abe et al.
(Continued)

FOREIGN PATENT DOCUMENTS

CN  110023393 A  * 7/2019  ............... C08J 3/12
JP  2001-187405 A  7/2001
(Continued)

OTHER PUBLICATIONS

JP-2019199577-A, Nov. 2019, Machine translation (Year: 2019).*
(Continued)

*Primary Examiner* — Satya B Sastri
(74) *Attorney, Agent, or Firm* — Greenblum & Bernstein, P.L.C.

(57) ABSTRACT

A method for producing a resin composition of the present invention is a method for producing a resin composition, the method including a step of obtaining a resin composition by heating and melt-kneading a mixture containing a particulate nucleating agent in which $D_{50}$ is equal to or more than 0.1 μm and equal to or less than 300 μm and a thermoplastic resin using a twin screw extruder (100) including, inside a cylinder (10), a screw (50) having kneading discs (60), in which the step of obtaining a resin composition includes an extrusion step of extruding the mixture supplied into the twin screw extruder (100) in an ejection direction under kneading conditions in which X and Y satisfy 4.0≤X in a range of $6.0 \times 10^3 \leq Y \leq 7.0 \times 10^4$ when a volume-based ejection amount is denoted by X ($10^{-6} \cdot \text{kg} \cdot \text{h}^{-1} \cdot \text{mm}^{-3}$), and a strain rate is denoted by Y ($\text{min}^{-1}$).

13 Claims, 2 Drawing Sheets

(51) Int. Cl.
B29C 48/40 (2019.01)
B29C 48/47 (2019.01)
B29C 48/50 (2019.01)

(56) References Cited

U.S. PATENT DOCUMENTS

2019/0300705 A1* 10/2019 Dabbous ............ C08G 18/3206
2020/0239664 A1    7/2020 Fukuda et al.

FOREIGN PATENT DOCUMENTS

| | | | | |
|---|---|---|---|---|
| JP | 2002241550 A | * | 8/2002 | |
| JP | 2011-152787 A | | 8/2011 | |
| JP | 2012-72335 A | | 4/2012 | |
| JP | 2019-199577 A | | 11/2019 | |
| JP | 2019199577 A | * | 11/2019 | ............... C08J 3/12 |
| JP | 2020-40356 A | | 3/2020 | |
| WO | WO-2017150662 A1 | * | 9/2017 | ............. C08F 10/06 |
| WO | WO 2017/209133 A1 | | 12/2017 | |
| WO | WO 2018/021002 A1 | | 2/2018 | |

OTHER PUBLICATIONS

CN-110023393-A, Jul. 2019, Machine translation (Year: 2019).*
WO-2017150662-A1, Sep. 2017, Machine translation (Year: 2019).*
JP-2002241550-A, Aug. 2002, Machine translation (Year: 2002).*
ISR for PCT/JP2021/000530, dated Mar. 9, 2021.
Written Opinion of ISA for PCT/JP2021/000530, dated Mar. 9, 2021 (w/ translation).

* cited by examiner

METHOD FOR PRODUCING RESIN COMPOSITION AND METHOD FOR PRODUCING MOLDED ARTICLE

TECHNICAL FIELD

The present invention relates to a method for producing a resin composition and a method for producing a molded article.

BACKGROUND ART

There have been various developments so far regarding methods for producing a resin composition containing a particulate nucleating agent and a thermoplastic resin. As this type of technique, a technique disclosed in Patent Document 1 is known, for example. Patent Document 1 discloses a production method in which a composition in which a nucleating agent is blended in a crystalline thermoplastic resin is kneaded with an extruder (claim 1 of Patent Document 1 and the like).

RELATED DOCUMENT

Patent Document

[Patent Document 1] Japanese Unexamined Patent Publication No. 2012-072335

SUMMARY OF THE INVENTION

Technical Problem

However, as a result of the examination by the inventors of the present invention, it has been found that there is room for improvement in the method for producing a resin composition disclosed in Patent Document 1 in terms of production stability, transparency, and mechanical strength.

Solution to Problem

The inventors of the present invention have found that not only the production stability can be increased but also the characteristics of the obtained resin composition can be improved by appropriately adjusting the particle size distribution of a particulate nucleating agent and then appropriately setting the kneading conditions in which a twin screw extruder is used. Then, it has been found that stable evaluation can be performed by adopting two indexes, which are the volume-based ejection amount and the strain rate of the twin screw extruder, as the kneading conditions.

As a result of further diligent research based on such findings, it has been found that, by kneading and extruding a mixture containing a particulate nucleating agent having a predetermined particle size distribution and a thermoplastic resin based on kneading conditions in which the strain rate is set in a predetermined range and the volume-based ejection amount is set to be equal to or more than a predetermined value, the mechanical strength can be improved while inhibiting a decrease in transparency in the obtained resin composition while also increasing the production stability by the twin screw extruder, thereby completing the present invention.

According to the present invention,
a method for producing a resin composition is provided, the method including a step of obtaining a resin composition by heating and melt-kneading a mixture containing a particulate nucleating agent in which a cumulative 50% particle size ($D_{50}$) in a volume-based particle size distribution is equal to or more than 0.1 μm and equal to or less than 300 μm and a thermoplastic resin using a twin screw extruder including, inside a cylinder, a screw having kneading discs, in which the step of obtaining a resin composition includes an extrusion step of extruding the mixture supplied into the twin screw extruder in an ejection direction under kneading conditions in which X and Y satisfy $4.0 \leq X$ in a range of $6.0 \times 10^3 \leq Y \leq 7.0 \times 10^4$ when a volume-based ejection amount represented by Equation (I) is denoted by X ($10^{-6} \cdot kg \cdot h^{-1} \cdot mm^{-3}$), and a strain rate represented by Equation (II) is denoted by Y ($min^{-1}$).

In addition, according to the present invention,
a method for producing a molded article is provided, the method including a step of obtaining a molded article by molding the resin composition obtained by the above-mentioned method for producing a resin composition.

Advantageous Effects of Invention

According to the present invention, a production method for realizing a resin composition having excellent production stability and excellent transparency and mechanical strength, and a method for producing a molded article using the resin composition obtained by this production method.

DESCRIPTION OF EMBODIMENTS

A method for producing a resin composition of the present embodiment will be described.

The method for producing a resin composition of the present embodiment includes a step of obtaining a resin composition by heating and melt-kneading a mixture containing a particulate nucleating agent in which $D_{50}$ is equal to or more than 0.1 μm and equal to or less than 300 μm and a thermoplastic resin using a twin screw extruder.

The above-mentioned step of obtaining a resin composition includes an extrusion step of extruding the mixture supplied into the twin screw extruder in an ejection direction under kneading conditions in which X and Y satisfy $4.0 \leq X$ in a range of $6.0 \times 10^3 \leq Y \leq 7.0 \times 10^4$ when a volume-based ejection amount represented by Equation (I) is denoted by X ($10^{-6} \cdot kg \cdot h^{-1} \cdot mm^{-3}$), and a strain rate represented by Equation (II) is denoted by Y ($min^{-1}$).

The twin screw extruder includes, inside a cylinder, a screw having kneading discs.

$$\text{Volume-based ejection amount} = \text{ejection amount (kg/h) of twin screw extruder/internal capacity } (10^6 \cdot mm^3) \text{ of cylinder} \quad \text{Equation (I)}$$

$$\text{Strain rate} = \text{rotation rate } (min^{-1}) \text{ of screw} \times \text{radius (mm) of screw/width (mm) of narrow part inside cylinder} \quad \text{Equation (II)}$$

According to the findings of the inventors of the present invention, it has been found that not only the production stability can be increased but also the characteristics of the obtained resin composition can be improved by appropriately adjusting the particle size distribution of the particulate nucleating agent and then appropriately setting the kneading conditions in which the twin screw extruder is used, and that the production stability, and the characteristics of the obtained resin composition can be stably evaluated by adopting two indexes, which are the volume-based ejection amount and the strain rate of the twin screw extruder, as the kneading conditions.

Hereinafter, a specific description will be given using FIG. 1 and FIG. 2.

Figure 1:
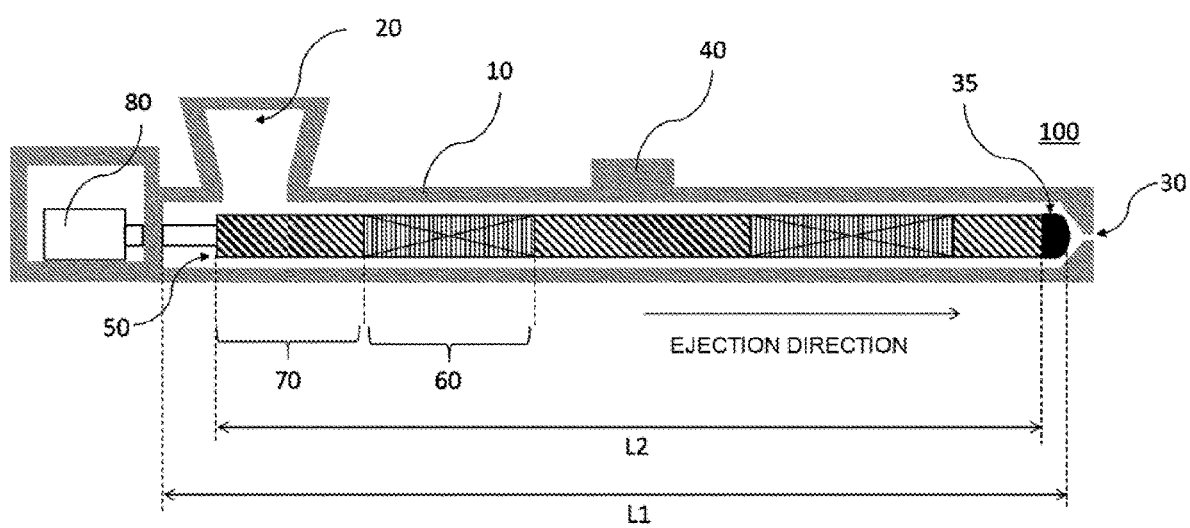
FIG. 1 is a diagram schematically showing the structure of a twin screw extruder.

FIG. 1 is a diagram schematically showing the structure of a twin screw extruder 100. FIG. 2 is a diagram schematically showing the cross section of a cylinder 10 in the twin screw extruder 100.

In all the drawings, similar constituent elements are designated by the same reference numerals, and description thereof will not be repeated as appropriate. Furthermore, the drawings are outline diagrams, and do not match actual dimensional ratios.

An example of the twin screw extruder 100 of FIG. 1 includes the cylinder 10, and two screws 50 installed inside the cylinder 10.

The cylinder 10 has a supply part 20, a release part 30, and an opening part 40. The internal temperature of the cylinder 10 is appropriately controlled by a heater (not shown) or the like.

A plurality of kneading discs 60 are installed on the screw 50 of a kneading section, and on the screw 50 of a conveying section 70, spiral blades (flights) are formed on the screw. A screw cap is provided at the tip end of the screw 50. The entire screw is fixed by the screw cap 35.

The two screws 50 rotate in the same direction by a motor 80 (driving unit).

The mixture containing each component, such as the particulate nucleating agent and the thermoplastic resin, of the resin composition is put from the supply part 20 in the twin screw extruder 100, moved in the ejection direction by the conveying section 70, biaxially kneaded by the kneading discs 60 of the kneading section, and extruded from the release part 30. The resin composition is obtained by such heating and melt-kneading.

Two conditions that the inventors have focused on among the kneading conditions based on the twin screw extruder 100 are the volume-based ejection amount and the strain rate.

(Volume-Based Ejection Amount)

The volume-based ejection amount is calculated based on Equation (I).

$$\text{Volume-based ejection amount} = \text{ejection amount (kg/h) of twin screw extruder 100/internal capacity } (10^6 \cdot mm^3) \text{ of cylinder 10} \quad \text{Equation (I)}$$

The feed amount (kg/h) from a feeder to the supply part 20 is used as the ejection amount of the twin screw extruder 100 in Equation (I). The value of the actual cylinder capacity ($10^6 \cdot mm^3$) below is used as the internal capacity of the cylinder 10.

Actual cylinder capacity

Figure 2:
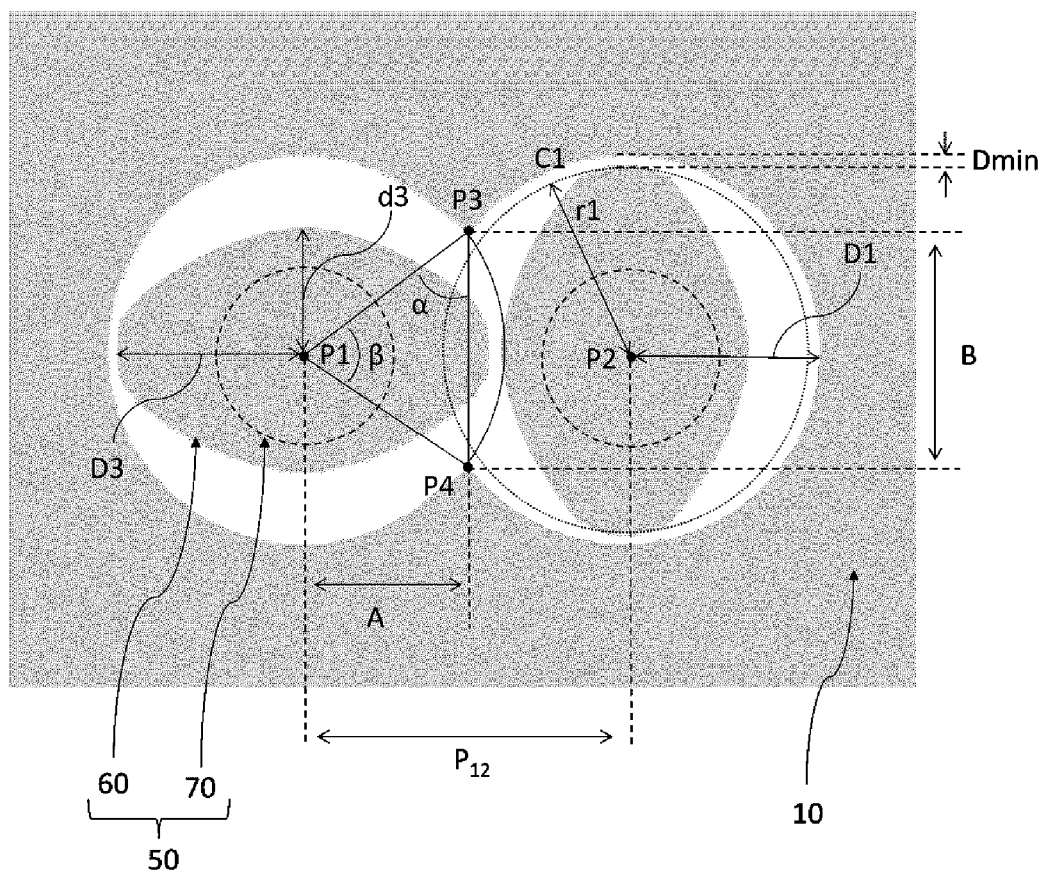
FIG. 2 is a diagram schematically showing the cross section of a cylinder in the twin screw extruder.

For the actual cylinder capacity ($10^6 \cdot mm^3$), a value obtained by integrating a length L2 of the screw 50 as the internal length of the cylinder 10 of FIG. 1 into a cross-sectional area F in the cross section inside the cylinder 10 shown in FIG. 2 is used.

FIG. 2 is a diagram schematically showing the cross-sectional view of the cylinder 10 when a portion of the kneading disc 60 is cut by a plane perpendicular to the axial center direction of the screw 50.

A specific calculation method is as follows.

Height of isosceles triangle (P1-P3-P4): $A = P_{12}/2$

Basic angle of isosceles triangle (P1-P3-P4): $\alpha = \arcsin(A/D1)$

Base of the isosceles triangle (P1-P3-P4): $B = \cos\alpha \times D1 \times 2$

Area of isosceles triangle (P1-P3-P4): $C = A \times B/2$

Central angle of sector (P1-P3-P4): $\beta = n - 2 \times \alpha$

Area of sector (P1-P3-P4): $E = D1 \times D1 \times n \times \beta/2n$

Bottom area (cross-sectional area) of cylinder: $F = 2 \times D1 \times D1 \times n - 2 \times (E - C)$ Actual cylinder volume: $G = F \times L2$ (Strain Rate)

The strain rate is calculated based on Equation (II).

$$\text{Strain rate} = \text{rotation rate (min}^{-1}\text{) of screw} \times \text{radius (mm) of screw/width (mm) of narrow part inside cylinder} \quad \text{Equation (II)}$$

Rotation rate of screw

The rotation rate of the screw 50 is controlled by the motor 80 (driving unit) of the twin screw extruder 100 in FIG. 1.

Radius of screw

FIG. 2 is a diagram schematically showing the cross section of the cylinder 10 when a portion of the kneading disc 60 is cut by a plane perpendicular to the axial center direction of the screw 50.

For the radius of the screw, a radius r1 of a circle C1 shown in FIG. 2 is used.

This circle C1 means the largest circle among the orbits drawn by the end portion of the kneading disc 60 when the screw 50 rotates, in the cross section to which the axial direction of the screw 50 is perpendicular.

A circle, which is shown by the dotted line in FIG. 2, inside the circle C1 means the smallest circle among the orbits drawn by the flights provided on the screw 50 in the conveying section 70 when the screw 50 rotates.

Width of narrow part ($D_{min}$)

Using FIG. 2, the inventors have examined the narrowest portion (narrow part) inside the cylinder 10 as follows.

First, in the cross section (FIG. 2) to which the axial direction of the screw 50 is perpendicular, while rotating the two kneading discs 60 with each other, the gap width therebetween is measured.

Subsequently, in the same cross section, the gap width between the kneading disc 60 and the inner wall of the cylinder 10 is measured.

As a result, it has been found that the gap between the end portion in the major axis direction of the kneading disc 60 and the inner wall of the cylinder 10 is the narrowest narrow part. In the cross section, the circular orbit drawn by the end portion on the major axis side of the kneading disc 60 corresponds to the circle C1. The width $D_{min}$ (mm) of the narrow part obtained as above is used as the above-mentioned width of the narrow part inside the cylinder.

As a result of diligent research based on these two, which are the volume-based ejection amount and the strain rate, the following findings have been obtained.

It has been found that by adopting the kneading conditions in which Y is set in the above-mentioned range and X is set to be equal to or more than the above-mentioned lower limit value when the volume-based ejection amount is denoted by X ($10^{-6} \cdot kg \cdot h^{-1} \cdot mm^{-3}$), and the strain rate is denoted by Y ($min^{-1}$), the mechanical strength can be improved while also inhibiting a decrease in the transparency in the obtained resin composition while also increasing the production stability by the twin screw extruder 100.

The detailed mechanism is not clear, but it is thought that the degree of kneading by the kneading disc 60 becomes appropriate by appropriately controlling the strain rate and the volume-based ejection amount, thereby improving not only the production stability of the twin screw extruder 100 but also the characteristics of the obtained resin composition.

That is, it is thought that by adding two indexes, which are the strain rate and the volume-based ejection amount, in the kneading conditions and appropriately controlling such kneading conditions, the degrees of dispersion and distribution of the particulate nucleating agent in the molten thermoplastic resin become appropriate, and thereby the effect as a nucleating agent of the particulate nucleating agent is sufficiently exhibited in the obtained resin composition, which increases the mechanical strength such as a bending modulus of elasticity while also inhibiting a deterioration of the tone such as transparency thereof.

The step of obtaining a resin composition has the kneading conditions in which X and Y satisfy $4.0 \leq X$ in the range of $6.0 \times 10^3 \leq Y \leq 7.0 \times 10^4$. In this case, X and Y are each represented by two significant figures.

During the step of obtaining a resin composition, the lower limit of Y is equal to or more than $6.0 \times 10^3$, preferably equal to or more than $7.0 \times 10^3$, and more preferably equal to or more than $8.0 \times 10^3$. Accordingly, vent-up and the like are inhibited, which makes it possible to improve the production stability of the resin composition. Meanwhile, the upper limit of Y is equal to or less than $7.0 \times 10^4$, preferably equal to or less than $6.9 \times 10^4$, and more preferably equal to or less than $6.8 \times 10^4$. Accordingly, the kneading conditions can be stably maintained in the twin screw extruder 100 in practical use. In addition, the resin composition can be stably extruded.

During the step of obtaining a resin composition, the lower limit of X is equal to or more than 4.0, preferably equal to or more than 4.5, and more preferably equal to or more than 5.0 while also setting Y in the above-mentioned range of the upper limit and the lower limit. Accordingly, the generation of die drool at a die lip can be inhibited. Therefore, the pellet-shaped resin composition can be stably produced. Furthermore, this makes it possible to improve bending elasticity while also increasing transparency in the resin composition in which transparency is required. Furthermore, fluctuations in the transparency and the bending modulus of elasticity in the resin composition can be reduced.

According to the present embodiment, by increasing X after satisfying $4.0 \leq X$ in the range of $6.0 \times 10^3 \leq Y \leq 7.0 \times 10^4$ under the kneading conditions during the extrusion step, the bending modulus of elasticity can be increased while reducing the HAZE in the obtained resin composition while also improving production stability.

Furthermore, the kneading conditions during the extrusion step may further satisfy $X \leq 500$. That is, the upper limit of X is not particularly limited, but it may be equal to or less than 500, preferably equal to or less than 450, and more preferably equal to or less than 400, for example. Accordingly, vent-up and the like are inhibited, which makes it possible to improve the production stability of the resin composition.

Furthermore, the kneading conditions during the extrusion step may further satisfy $2.7 \times 10^2 \leq Y/X \leq 1.3 \times 10^4$.

By using the index Y/X in which the strain rate and the volume-based ejection amount are combined, it becomes possible to evaluate the characteristics of the resin composition more stably.

The lower limit of Y/X is equal to or more than $2.7 \times 10^2$, preferably equal to or more than $3.0 \times 10^2$, and more preferably equal to or more than $3.5 \times 10^2$, for example. Meanwhile, the upper limit of Y/X is equal to or less than $1.3 \times 10^4$, preferably equal to or less than $1.2 \times 10^4$, and more preferably equal to or less than $1.0 \times 10^4$, for example. By setting Y/X in the above-mentioned range, that is, by setting the kneading conditions such that the slope Y/X indicating the ratio between the volume-based ejection amount and the strain rate is in a predetermined range, the bending modulus of elasticity can be increased while reducing the HAZE in the obtained resin composition while also improving production stability. Furthermore, fluctuations in the transparency and the bending modulus of elasticity in the resin composition can be reduced.

During the step of obtaining the resin composition, it is sufficient for the heating temperature in the heating and melt-kneading be appropriately selected depending on the thermoplastic resin and the like, and it may be 150° C. to 300° C., for example. The lower limit of this heating temperature may be equal to or higher than 150° C., preferably equal to or higher than 180° C., for example. The upper limit of the heating temperature may be equal to or lower than 300° C., preferably equal to or lower than 280° C., for example.

The volume-based ejection amount is obtained by dividing the ejection amount of the twin screw extruder 100 by the internal capacity of the cylinder 10. Accordingly, this volume-based ejection amount can be utilized as an index even when the twin screw extruder 100 is scaled up or scaled down. Therefore, a twin screw extruder having internal capacities of various sizes can be used.

As the twin screw extruder 100, known ones can be used, but twin screw kneading extruders such as TEX series (TEX28V, TEX44αIII, TEX54αII, and the like) manufactured by The Japan Steel Works, Ltd., TEM series manufactured by Toshiba Machine Co., Ltd., and ZSK series manufactured by Coperion GmbH may be used.

The screw diameter (φ) of the twin screw extruder 100 is not particularly limited, but it may be 10 mm to 500 mm, for example. The lower limit of the screw diameter (φ) may be equal to or more than 10 mm, or equal to or more than 20 mm, for example. The upper limit of the screw diameter (φ) may be equal to or less than 500 mm, equal to or less than 300 mm, or equal to or less than 100 mm, for example. Depending on the screw diameter (φ), the size of the internal capacity of the twin screw extruder is appropriately selected.

Furthermore, in the calculation of the internal capacity of the cylinder 10, L2 in FIG. 1 is adopted as the internal length of the cylinder 10.

In FIG. 1, the upstream portion and the downstream portion of the cylinder 10 are positioned in this order along the direction of the ejection direction. The inventors have thought that the upstream portion of the cylinder 10 does not have the screw 50 and is not filled with molten resin, which makes it unrelated to kneading, and that the further side of the screw cap 35 in the downstream portion of the cylinder 10 does not have a narrow part, which makes it irrelevant to kneading, and therefore have adopted L2 instead of L1 in FIG. 1 as the internal length of the cylinder 10. That is, L2 in FIG. 1 is the total length of the conveying section 70 and the kneading discs 60 in the axial center direction.

In the twin screw extruder 100, even when the rotation rate of the screw 50 is constant, the strain rate of the kneading disc 60 varies depending on the location around the disc and the rotation positions of the two discs. The inventors have found that the characteristics of the resin composition can be stably evaluated by using the strain rate in the narrow part as an index among a plurality of strain rates.

The screw 50 may be configured to include the portion (kneading section) in which the kneading discs 60 are installed and the portion (conveying section 70) in which the kneading discs 60 are not installed.

As the kneading disc 60, a known kneading disc may be used. For example, a kneading disc (KD) in which the tip end of the disc has a shape parallel to the axis of the screw 50, a twist kneading disc (TKD) in which the tip end of the disc has the lead, and the like may be used.

Furthermore, the kneading disc 60 may be of any type of forward sending, backward sending, and orthogonal.

These may be used alone or may be used in combination of two or more types.

The screw 50 may have an element known to be used in addition to the kneading disc 60. Examples of other elements include mixing left-hand 1 lobe screws (Back Mixing Single flight screw (BMK)), other mixing screws, and gear kneading.

The kneading disc 60 may be configured of one or two or more elements formed by combining a plurality of discs (chips). In the screw 50, the elements may be disposed to be spaced apart or continuous with each other in any position.

L3 is the total value (mm) of the widths of each disc in the kneading disc 60, N is the number of discs in the kneading discs 60, D1 is the internal radius (mm) of the cylinder 10, and L2 is the length (mm) of the screw 50 in the axial center direction.

The width ((L3/D1)/N) of one disc is not particularly limited, but it may be 0.05 to 0.6, preferably 0.08 to 0.5, for example, as an average value.

The shift angle of the kneading disc 60 may be 15 degrees to 90 degrees or may be 20 degrees to 80 degrees, for example, as an average value.

The combination of the minimum and maximum shift angles of the kneading disc 60 may be 15 degrees and 90 degrees, or may be 30 degrees and 90 degrees, for example.

The twin screw extruder 100 may be configured such that D1, L2, and L3 satisfy $0.02 \leq (L3/D1)/(L2/D1) \leq 1.0$, preferably $0.04 \leq (L3/D1)/(L2/D1) \leq 0.9$, for example. By being in the above-mentioned range, the bending modulus of elasticity can be increased while reducing the HAZE in the obtained resin composition while also improving production stability.

Hereinafter, the components in the resin composition will be described in detail.

The resin composition of the present embodiment contains the particulate nucleating agent and the thermoplastic resin.

The particulate nucleating agent is a nucleating agent in a granular shape and is one of modifiers for polymer materials. Usually, there are various names such as a crystal nucleating agent, a crystallization accelerating agent, a transparentizing agent, and the like, but in the present specification, these are collectively referred to as a "nucleating agent".

The particle size distribution of the particulate nucleating agent is dry-measured using a laser diffraction type particle size distribution measuring method, and the average particle size (cumulative 50% particle size in the volume-based particle size distribution) of this particulate nucleating agent is denoted as $D_{50}$.

The upper limit of the average particle size $D_{50}$ of the particulate nucleating agent may be equal to or less than 300 µm, equal to or less than 250 µm, equal to or less than 200 µm, equal to or less than 150 µm, equal to or less than 100 µm, equal to or less than 75 µm, or equal to or less than 50 µm. This makes it possible to improve the transparency of the particulate nucleating agent. Meanwhile, the lower limit of $D_{50}$ of the particulate nucleating agent may be equal to or more than 0.1 µm, equal to or more than 0.2 µm, equal to or more than 0.3 µm, or equal to or more than 1.0 µm. This makes it possible to realize a balance with various physical properties. Furthermore, although the detailed mechanism is not clear, the effect obtained by the method for producing a resin composition using the above-mentioned kneading conditions can be stably exhibited by setting the particle size distribution of the particulate nucleating agent in such a range.

In the present embodiment, the above-mentioned average particle size of the particulate nucleating agent can be controlled by appropriately selecting the type and the blending amount of each component contained in the particulate nucleating agent, the preparation method of the particulate nucleating agent, and the like, for example. Among these, appropriate selection of pulverization conditions such as a pulverization method and a pulverization time, classification conditions such as cutting of coarse particles, and the like is an example of factors for setting the average particle size of the particulate nucleating agent in a desired numerical value range.

The particulate nucleating agent preferably contains a compound represented by General Formula (1) as a metal salt of an aromatic phosphoric acid ester. These may be used alone or may be used in combination of two or more types.

[Chem. 1]

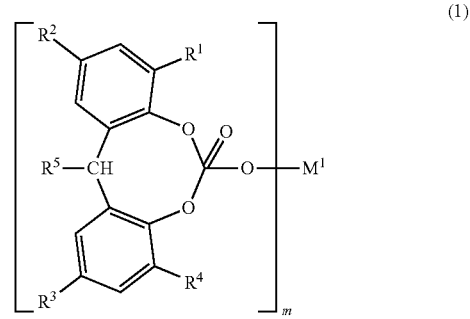

(1)

In General Formula (1), $R^1$ to $R^4$ each independently represent a hydrogen atom or a linear or branched alkyl group having 1 to 9 carbon atoms, $R^5$ represents a hydrogen atom or an alkyl group having 1 to 4 carbon atoms, and m represents 1 or 2, provided that when m is 1, $M^1$ represents a hydrogen atom, $Al(OH)_2$, or an alkali metal atom, and when m is 2, $M^1$ represents a group 2 element, $Al(OH)$, or Zn.

Examples of the alkyl group having 1 to 9 carbon atoms which is represented by $R^1$, $R^2$, $R^3$, and $R^4$ in General Formula (1) include a methyl group, an ethyl group, a propyl group, an isopropyl group, a butyl group, a sec-butyl group, a tert-butyl group, an isobutyl group, an amyl group, an isoamyl group, a tert-amyl group, a hexyl group, a cyclohexyl group, a heptyl group, an isoheptyl group, and a tert-heptyl group.

Examples of the alkali metal represented by $M^1$ in General Formula (1) include sodium (Na), potassium (K), and lithium (Li).

Examples of the group 2 element represented by $M^1$ in General Formula (1) include beryllium (Be), magnesium (Mg), calcium (Ca), strontium (Sr), barium (Ba), and radium (Ra). Among these, magnesium and calcium are preferable because the nucleating agent effect of the nucleating agent component is remarkable.

Among the compounds represented by General Formula (1), a compound in which m is 1 is preferable. The particulate nucleating agent preferably contains a metal salt of an aromatic phosphoric acid ester represented by General Formula (1) in which $M^2$ is sodium and m is 1.

Furthermore, in General Formula (1), a compound in which $R^1$, $R^2$, $R^3$, and $R^4$ are those selected from the group consisting of a methyl group, an ethyl group, a sec-butyl group, and a tert-butyl group is preferable, a compound in which $R^1$, $R^2$, $R^3$, and $R^4$ are those selected from the group consisting of a methyl group and a tert-butyl group is more preferable, and a compound in which $R^1$, $R^2$, $R^3$, and $R^4$ are a tert-butyl group is further preferable. Furthermore, a compound in which $R^5$ is a hydrogen atom or a methyl group is preferable, and a compound in which $R^5$ is a hydrogen atom is particularly preferable.

The compound represented by General Formula (1) preferably includes one or two or more compounds represented by any of Chemical Formula (2) to Chemical Formula (15). Among these, from the viewpoint of improving the physical properties of the resin, the compound represented by any of Chemical Formula (2) to Chemical Formula (6) is preferable, and the compound represented by Chemical Formula (5) is particularly preferable. From the viewpoint of improving transparency, the compound represented by any of Chemical Formula (7) to Chemical Formula (15) is preferable, and the compound represented by any of Chemical Formula (7), Chemical Formula (10), and Chemical Formula (12) is more preferable.

[Chem. 2]

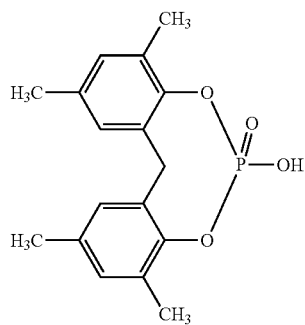

(2)

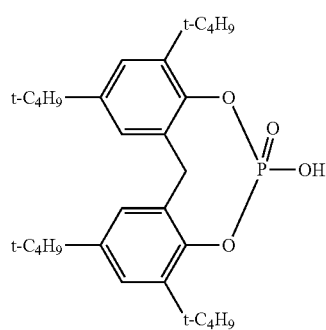

(3)

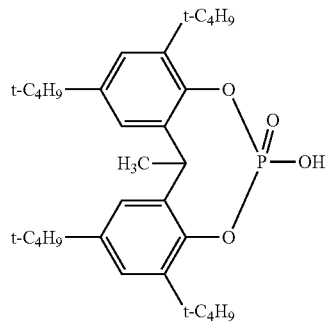

(4)

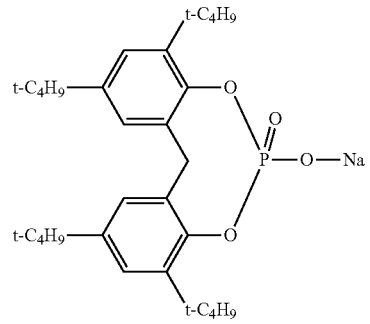

(5)

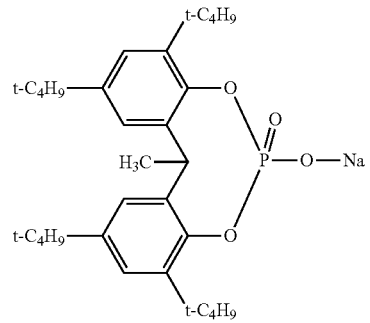

(6)

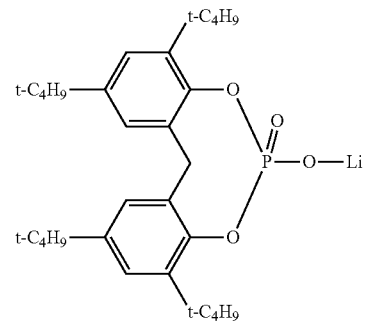

(7)

(8)
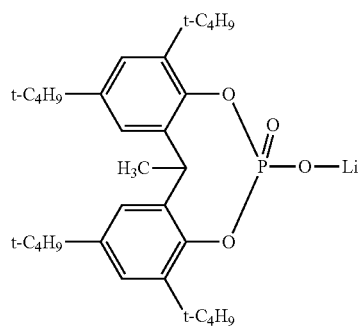

(9)
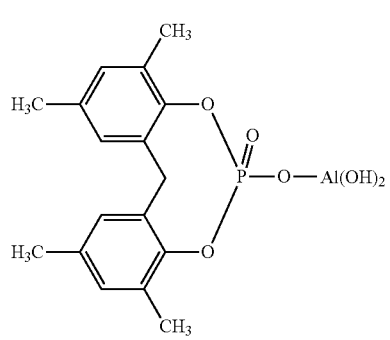

(10)
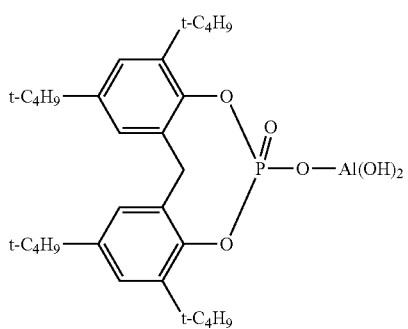

(11)
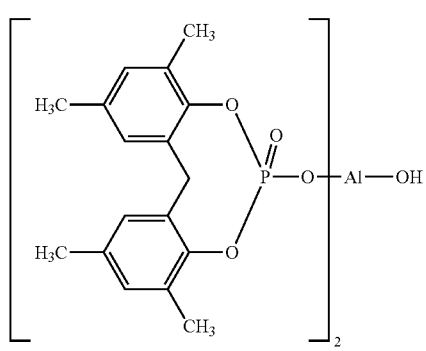

(12)
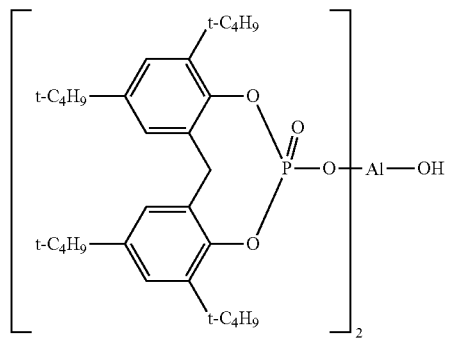

(13)
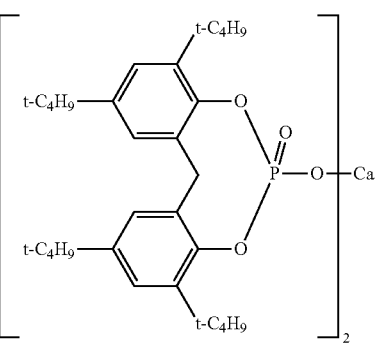

(14)
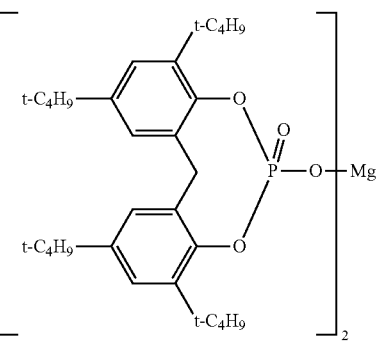

(15)
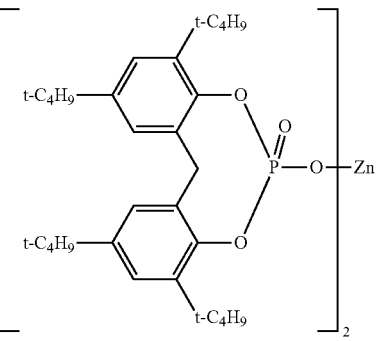

As a method for producing the compound represented by General Formula (1), for example, phosphorus trichloride (or phosphorus oxychloride) and 2,2'-alkylidene phenol are reacted and then hydrolyzed as necessary to form a cyclic acidic phosphoric acid ester. Next, the cyclic acidic phosphoric acid ester and a metal hydroxide such as sodium hydroxide or potassium hydroxide are reacted, and the obtained reaction product is appropriately purified (filtered or the like) and dried to obtain the above-mentioned compound (a metal salt of an aromatic phosphoric acid ester). Furthermore, a metal salt of an aromatic phosphoric acid ester may be synthesized by a conventionally known method and used as the above-mentioned compound.

Furthermore, the obtained compound is dissolved in a solvent, and reacted with another metal hydroxide such as lithium hydroxide or reacted with a salt of any of aluminum, magnesium, and a group 2 element. The obtained reaction product is purified and dried to obtain the above-mentioned compound of another form.

Furthermore, in the particulate nucleating agent, as nucleating agent components other than the compound represented by General Formula (1), the following examples are used: carboxylic acid metal salts such as sodium benzoate, 4-tert-butyl aluminum benzoate, sodium adipate, di-sodium bicyclo[2.2.1]heptane-2,3-dicarboxylate, and calcium cyclohexane 1,2-dicarboxylate; polyol derivatives such as dibenzylidene sorbitol, bis(methylbenzylidene) sorbitol, bis (3,4-dimethylbenzylidene) sorbitol, bis(p-ethylbenzylidene) sorbitol, bis(dimethylbenzylidene)sorbitol, and 1,2,3-trideoxy-4,6:5,7-O-bis(4-propylbenzylidene)nonitol; amide compounds such as N,N',N"-tris[2-methylcyclohexyl]-1,2,3-propanetricarboxamide, N,N',N"-tricyclohexyl-1,3,5-benzenetricarboxamide, N,N'-dicyclohexyl naphthalenedicarboxamide, and 1,3,5-tri(dimethylisopropylamine)benzene; and the like. However, examples are not limited to the above examples. These may be used alone or may be used in combination of two or more types.

The particulate nucleating agent of the present embodiment is obtained by pulverizing the obtained compound with an appropriate pulverization unit, if necessary. In the particulate nucleating agent, coarse particles may be excluded by sieving with a sieve having a predetermined mesh size. Furthermore, the particulate nucleating agent can contain one or two or more types of powdered compounds. For example, two or more types of compounds having different particle size distributions or two or more types of classified compounds may be combined at an appropriate ratio and blended to obtain the above-mentioned particulate nucleating agent.

Examples of the above-mentioned pulverization unit include mortars, ball mills, rod mills, tube mills, conical mills, vibration ball mills, high swing ball mills, roller mills, pin mills, hammer mills, attrition mills, jet mills, jet mizers, micronizers, nanomizers, Majac mills, micro atomizers, colloid mills, premier colloid mills, micron mills, Charlotte colloid mills, rotary cutters, and dry stirred media mills. These pulverizers can be used alone or in combination of two or more types, and are appropriately selected depending on the type of a raw material powder to be pulverized, a pulverization time, and the like.

The particulate nucleating agent of the present embodiment may be composed of only the compound represented by General Formula (1), or may contain the other nucleating agent components exemplified above and other components in the range of achieving the object of the present invention.

Examples of the other components include metal salts of aromatic phosphoric acid esters other than the compound represented by General Formula (1), metal salts of fatty acid, silicic acid-based inorganic additive components, and hydrotalcites. These may be used alone or may be used in combination of two or more types.

As the above-mentioned metal salts of fatty acid, a compound represented by General Formula (16) is preferably contained, for example.

[Chem. 3]

In General Formula (16), $R^6$ represents a linear or branched aliphatic group having 9 to 30 carbon atoms, M represents a metal atom, and n is an integer of 1 to 4, representing an integer corresponding to the valence of the metal atom of M.

In General Formula (16), examples of the linear or branched aliphatic group having 9 to 30 carbon atoms represented by $R^6$ include an alkyl group and an alkenyl group which have 9 to 30 carbon atoms, and these may be substituted with a hydroxyl group.

Examples of fatty acids composing the above-mentioned metal salts of fatty acid include saturated fatty acids such as capric acid, 2-ethylhexanoic acid, undecylic acid, lauric acid, tridecylic acid, myristic acid, pentadecylic acid, palmitic acid, margaric acid, stearic acid, nonadecylic acid, arachidic acid, heneicosylic acid, behenic acid, tricosylic acid, lignoceric acid, cerotic acid, montanic acid, and melissic acid; and linear unsaturated fatty acids such as 4-decenoic acid, 4-dodecenoic acid, palmitoleic acid, α-linolenic acid, linoleic acid, γ-linolenic acid, stearidonic acid, petroselinic acid, oleic acid, elaidic acid, vaccenic acid, eicosapentaenoic acid, docosapentaenoic acid, and docosahexaenoic acid.

The above-mentioned metal salts of fatty acid are preferably one in which an aliphatic group represented by $R^6$ has 10 to 21 carbon atoms, and are particularly preferably metal salts of lauric acid, myristic acid, palmitic acid, stearic acid, behenic acid, oleic acid, and 12-hydroxystearic acid.

Examples of the metal atom represented by M include alkali metals, magnesium, calcium, strontium, barium, titanium, manganese, iron, zinc, silicon, zirconium, yttrium, barium, and hafnium. Among these, alkali metals such as sodium, lithium, and potassium are preferable, and sodium and lithium are particularly preferably used because the crystallization temperature is high.

Examples of the above-mentioned silicic acid-based inorganic additive components include fumed silica, fine particle silica, silica stone, diatomaceous earth, clay, kaolin, silica gel, calcium silicate, sericite, kaolinite, flint, feldspar powders, vermiculite, attapulgite, talc, mica, minnesotaite, and pyrophyllite. Among these, one in which the particle structure is a layered structure, and one in which the silicon content is equal to or more than 15% by mass are preferable. Examples of these preferable inorganic additives include sericite, kaolinite, talc, mica, minnesotaite, and pyrophyllite, where talc and mica are more preferable.

The above-mentioned hydrotalcites may be natural products or synthetic products, for example, and can be used regardless of whether or not surface treatment is performed and the presence or absence of water of crystallization. Examples thereof include a basic carbonate represented by the following general formula.

$M_xMg_yAl_zCO_3(OH)_{xp+2y+3z-2} \cdot nH_2O$ (In the above-mentioned general formula, M represents an alkali metal or zinc, X represents a number from 0 to 6, y represents a number from 0 to 6, z represents a number from 0.1 to 4, p represents the valence of M, and n represents the number of water of crystallization from 0 to 100.)

The particulate nucleating agent containing the above-mentioned other components is a particulate nucleating agent composition containing the compound represented by General Formula (1), and may be composed such that it contains one or more selected from the group consisting of metal salts of another aromatic phosphoric acid ester, metal salts of fatty acid, silicic acid-based inorganic additive components, and hydrotalcites, preferably one or more selected from the group consisting of metal salts of fatty acid, talc, mica, and hydrotalcites.

Such a particulate nucleating agent can be obtained by performing pulverization treatment by appropriately combining the above-mentioned pulverization unit in the coexistence of the compound represented by General Formula (1) and the other components, for example. Furthermore, the above-mentioned pulverization unit, sieving, a blending method, and the like can also be used.

The particulate nucleating agent of the present embodiment functions as a nucleating agent and transparentizing agent added at the time of a molding process of a thermoplastic resin such as a crystalline polymer. In the crystalline polymer, improvement (modification effect) of a crystallization temperature, a heat denaturation temperature, a bending modulus of elasticity, hardness, and transparency can be realized. In addition, molding cycle properties can be increased, thereby improving productivity.

A method of adding the above-mentioned particulate nucleating agent to the above-mentioned thermoplastic resin is not particularly limited, and a generally used method can be applied as it is. For example, a method of dry-blending a powder substance or pellet of the thermoplastic resin and a powder substance of the above-mentioned particulate nucleating agent can be used.

The resin composition obtained by the above-mentioned method for producing a resin composition can be used in various forms, and any of a pellet form, a granular form, or a powdered form may be used, for example. From the viewpoint of handleability, the pellet form is preferable.

Examples of the above-mentioned thermoplastic resin include polyolefin resins, styrene resins, polyester resins, polyether resins, polycarbonate resins, polyamide resins, and halogen-containing resins. Among these, it is preferable to use a crystalline polymer.

As further examples of the above-mentioned thermoplastic resin, thermoplastic resins such as petroleum resins, coumarone resins, polyvinyl acetate, acrylic resins, polymethyl methacrylates, polyvinyl alcohols, polyvinyl formals, polyvinyl butyrals, polyphenylene sulfides, polyurethanes, cellulosic resins, polyimide resins, polysulfones, and liquid crystal polymers, and blended products thereof can be used.

The crystalline polymer is not particularly limited, and examples thereof include polyolefin-based polymers such as polypropylene, high density polyethylene, low density polyethylene, linear low density polyethylene, polybutene-1, poly3-methylpentene, poly4-methylpentene, and α-olefin polymers of ethylene/propylene block or random copolymers or the like; thermoplastic linear polyester-based polymers such as polyethylene terephthalate, polybutylene terephthalate, and polyhexamethylene terephthalate; polysulfide-based polymers such as polyphenylene sulfide; polylactic acid-based polymers such as polycaprolactone; linear polyamide-based polymers such as polyhexamethylene adipamide; and crystalline polystyrene-based polymers such as syndiotactic polystyrene.

Among these, polyolefin-based polymers with which the effect of using the particulate nucleating agent is remarkably exhibited are preferable, where polypropylene-based resins such as polypropylene, ethylene/propylene block or random copolymers, α-olefin/propylene block or random copolymers other than ethylene, and a mixture of these propylene-based polymers and another α-olefin polymer are particularly preferable.

A case in which crystalline α-olefin polymers, particularly polypropylene-based resins such as polypropylene, ethylene/propylene copolymers, and a mixture of these propylene polymers and another α-olefin polymers are used as the above-mentioned crystalline polymer is useful. These polypropylene-based resins can be used regardless of intrinsic viscosity, isotactic pentad fraction, density, molecular weight distribution, melt flow rate, rigidity, and the like thereof. For example, polypropylene-based resins as disclosed in Japanese Unexamined Patent Publication No. S63-37148, Japanese Unexamined Patent Publication No. S63-37152, Japanese Unexamined Patent Publication No. S63-90552, Japanese Unexamined Patent Publication No. S63-210152, Japanese Unexamined Patent Publication No. S63-213547, Japanese Unexamined Patent Publication No. S63-243150, Japanese Unexamined Patent Publication No. S63-243152, Japanese Unexamined Patent Publication No. S63-260943, Japanese Unexamined Patent Publication No. S63-260944, Japanese Unexamined Patent Publication No. S63-264650, Japanese Unexamined Patent Publication No. H01-178541, Japanese Unexamined Patent Publication No. H02-49047, Japanese Unexamined Patent Publication No. H02-102242, Japanese Unexamined Patent Publication No. H02-251548, Japanese Unexamined Patent Publication No. H02-279746, Japanese Unexamined Patent Publication No. H03-195751, and the like can also be suitably used.

Furthermore, the above-mentioned thermoplastic resin may contain, as rubber, isoprene rubber, butadiene rubber, acrylonitrile-butadiene copolymer rubber, styrene-butadiene copolymer rubber, ethylene-propylene random copolymers, ethylene-1-butene random copolymers, ethylene-1-hexene random copolymers, ethylene-1-octene random copolymers, and thermoplastic elastomers such as polyester-based elastomers, nitrile-based elastomers, nylon-based elastomers, vinyl chloride-based elastomers, polyamide-based elastomers, and polyurethane-based elastomers. These may be used alone or may be used in combination of two or more types. As these thermoplastic elastomers, any of homopolymers or copolymers may be used.

The content of the particulate nucleating agent is usually 0.001 to 10 parts by weight, preferably 0.005 to 8 parts by weight, and more preferably in the range of 0.01 to 5 parts by weight with respect to 100 parts by weight of the thermoplastic resin (for example, the crystalline polymer). This makes it possible to sufficiently obtain the effect of modifying the thermoplastic resin, particularly the crystalline polymer.

In the present specification, "to" means that an upper limit value and a lower limit value are included unless otherwise specified.

If necessary, the resin composition of the present embodiment can contain additives such as antioxidants, light stabilizers, ultraviolet absorbers, pigments, fillers, organic tin compounds, plasticizers, epoxy compounds, foaming agents, antistatic agents, flame retardants, lubricants, heavy metal deactivators, hydrotalcites, organic carboxylic acids, colorants, silicic acid-based additives, process aids, and neutralizing agents. These may be used alone or may be used in combination of two or more types.

Examples of the above-mentioned antioxidants include phosphorus-based antioxidants, phenol-based antioxidants, and thioether-based antioxidants.

Examples of the above-mentioned antistatic agents include cationic surfactants, anionic surfactants, nonionic surfactants, and amphoteric surfactants.

Examples of the above-mentioned flame retardants include halogen-based compounds, phosphoric acid ester-based compounds, phosphoric acid amide-based compounds, melamine-based compounds, melamine salt compounds of polyphosphoric acid, fluororesins, and metal oxides.

Examples of the above-mentioned lubricants include hydrocarbon-based, fatty acid-based, aliphatic alcohol-based, aliphatic ester-based, aliphatic amide-based, and metal soap-based lubricants.

Examples of the above-mentioned fillers include inorganic substances such as talc, silica, calcium carbonate, glass fiber, potassium titanate, and potassium borate. The filler may be a granular material or a fibrous material, and it is preferable to use one that has been surface-treated as necessary.

Examples of the neutralizing agents include metal salts of fatty acid such as calcium stearate, lithium stearate, and sodium stearate, or fatty acid amide compounds such as ethylenebis(stearamide), ethylenebis(12-hydroxystearamide), and stearate amide.

The content of the additive in the above-mentioned resin composition is preferably 0.001 to 10 parts by weight, for example, with respect to 100 parts by weight of the crystalline polymer. By setting such a numerical value range, the effect of the additive can be improved.

The resin composition can be used for molded articles such as injection-molded articles, fibers, flat yarns, biaxially stretched films, uniaxially stretched films, non-stretched films, sheets, thermo-molded articles, extrusion blow-molded articles, injection blow-molded articles, injection stretch blow-molded articles, deformed extrusion-molded articles, and rotation-molded articles. Among these, as the molded article, an injection-molded article, a film, a sheet, and a thermo-molded article are preferable.

A method for producing the molded article of the present embodiment includes a step of molding the resin composition obtained by the above-mentioned method for producing a resin composition based on various molding methods, thereby the above-mentioned molded article can be obtained.

The molding method is not particularly limited, and examples thereof include an injection molding method, an extrusion molding method, a blow molding method, a rotation molding, a vacuum molding method, an inflation molding method, a calendar molding method, a slash molding method, a dip molding method, and foam molding method. Among these, an injection molding method, an extrusion molding method, and a blow molding method are preferable.

The above-mentioned resin composition can be used for various usages such as building materials, agricultural materials, components for vehicles such as automobiles, trains, ships, and aircraft, packaging materials, miscellaneous goods, toys, home electronics, and medical products, although there are no particular limitations. Specific examples include vehicle components such as bumpers, dashboards, instrument panels, battery cases, luggage cases, door panels, door trims, and fender liners; resin components for home electronics such as refrigerators, washing machines, and vacuum cleaners; household products such as tableware, bottle caps, buckets, and bath products; resin components for connection such as connectors; miscellaneous goods such as toys, storage containers, and synthetic paper; medical molded articles such as medical packs, syringes, catheters, medical tubes, syringe preparations, infusion bags, reagent containers, medicinal beverage containers, and individual packaging of medicinal beverages; building materials such as wall materials, floor materials, window frames, wallpaper, and windows; wire covering materials; agricultural materials such as houses, tunnels, flat yarn mesh bags; industrial materials such as pallets, pail cans, back grinding tapes, liquid crystal protective tapes, pipes, modified silicone polymers for sealing materials; food packaging materials such as wraps, trays, cups, films, bottles, caps, and storage containers; other 3D printer materials; and separator films for batteries. Furthermore, the above-mentioned resin composition can be used for usages when various post-treatments are performed, for example, usages when sterilization by radiation is performed, such as medical usages and food packaging usages, or usages when low temperature plasma treatment or the like is performed after molding to improve surface characteristics such as coatability. Among these, use for vehicle components, household products, and food packaging materials is preferable.

Although the embodiments of the present invention have been described above, these are examples of the present invention, and various configurations other than the above can be adopted. Furthermore, the present invention is not limited to the above-described embodiment, and modifications, improvements, and the like within the scope of achieving the object of the present invention are included in the present invention.

EXAMPLES

Hereinafter, the present invention will be described in detail with reference to examples, but the present invention is not limited to the description of these examples.

(Synthesis of compound No. 1)

A solution of 486 g (1 mol) of 2,2'-methylenebis(4,6-di-t-butylphenyl)phosphate, 42 g (1.05 mol) of sodium hydroxide, 100 g of water, and 97 g of methanol were put in a kneader and kneaded at room temperature for 1 hour. Drying was performed under reduced pressure to obtain 421 g of a compound No. 1 that was a white powder.

[Chem. 4]

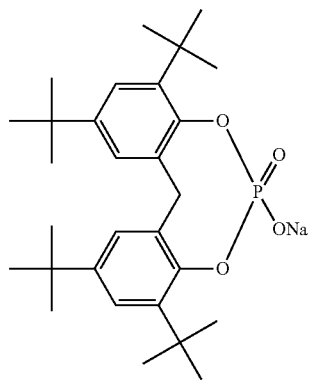

Compound No. 1

Test Example 1

The obtained compound No. 1 was pulverized with a ball mill for 30 minutes and sieved with a sieve having the mesh size of 355 μm to obtain a particulate nucleating agent 1 (average particle size ($D_{50}$): 4 μm).

Test Example 2

The obtained compound No. 1 was used as a particulate nucleating agent 2 (average particle size ($D_{50}$): 35 μm) without pulverization treatment.

The average particle size of the particulate nucleating agent (cumulative 50% particle size in the volume-based particle size distribution: $D_{50}$) was dry-measured using a laser diffraction type particle size distribution measuring method.

The information on raw material components in Table 1 is shown below.

(Thermoplastic Resin)

Resin 1: a polypropylene homopolymer (manufactured by Prime Polymer Co., Ltd., J-108P)

Resin 2: a polypropylene block copolymer (manufactured by Prime Polymer Co., Ltd., J-707G)

(Particulate Nucleating Agent)

Particulate nucleating agent 1: the particulate nucleating agent 1 obtained in Test Example 1 above Particulate nucleating agent 2: the particulate nucleating agent 2 obtained in Test Example 2 above (Additive)

Filler 1: talc (silicate mineral, manufactured by Matsumura Sangyo Co., Ltd., Crown Talc PP)

Rubber 1: an ethylene-octene random copolymer (manufactured by The Dow Chemical Company, Engage 8200)

Antioxidant 1: pentaerythritol tetrakis[3-(3,5-di-tert-butyl-4-hydroxyphenyl)propionate] (manufactured by ADEKA Corporation, AO-60, phenol-based antioxidant)

Antioxidant 2: tris(2,4-ditert-butylphenyl)phosphite (manufactured by ADEKA Corporation, ADK STAB 2112, phosphorus-based antioxidant)

Neutralizing agent 1: calcium stearate (manufactured by NOF Corporation, CaSt, catalyst deactivating agent)

<Production of Resin Composition>

(Examples 1 to 18 and Comparative Examples 1 and 2)

In each of examples and comparative examples, a thermoplastic resin, the particulate nucleating agent, and if necessary, an additive, were mixed at the blending ratios shown in Table 1 for 1 minute with a Henschel mixer to obtain a mixture.

The obtained mixture was subjected to an extrusion process under the kneading conditions (volume-based ejection amount, strain rate, and extrusion temperature) shown in Table 1 using a twin screw extruder (manufactured by The Japan Steel Works, Ltd., TEX28V) shown in Table 1.

The above-mentioned kneading conditions will be described using the twin screw extruder 100 of FIG. 1.

FIG. 1 is a diagram schematically showing the structure of the twin screw extruder 100 used in the above-mentioned <Production of resin composition>.

The twin screw extruder 100 includes the cylinder 10 having the supply part 20, the release part 30, and the opening part 40; and the screw 50 installed inside the cylinder 10 and having and a plurality of the kneading discs 60 (kneading section) and the conveying section 70. The twin screw extruder 100 includes two screws 50 rotating in the same direction by the motor 80 (driving unit).

For the conveying section 70 of the screw 50, a general screw A provided with spiral blades (flights) was used.

As the kneading disc 60, a kneading disc in which the tip end of each disc has a shape parallel to the axis of the screw 50 was used.

(Volume-Based Ejection Amount)

The volume-based ejection amount ($10^{-6} \cdot kg \cdot h^{-1} \cdot mm^{-3}$) was calculated based on Equation (I).

$$\text{Volume-based ejection amount} = \text{ejection amount (kg/h) of twin screw extruder 100/internal capacity } (10^6 \cdot mm^3) \text{ of cylinder 10} \quad \text{Equation (I)}$$

The feed amount (kg/h) from a feeder to the supply part 20 was used as the ejection amount of the twin screw extruder 100 in Equation (I) above. The value of the actual cylinder capacity ($10^6 \cdot mm^3$) below was used as the internal capacity of the cylinder 10.

Actual cylinder capacity

For the actual cylinder capacity ($10^6 \cdot mm^3$), a value obtained by integrating a length L2 of the screw 50 as the internal length of the cylinder 10 of FIG. 1 into a cross-sectional area F in the cross section inside the cylinder 10 shown in FIG. 2 was used. L2 is the total length of the conveying section 70 and the kneading disc 60 excluding the screw cap 35 in the axial center direction of the screw 50.

FIG. 2 is a diagram schematically showing the cross-sectional view of the cylinder 10 when a portion of the kneading disc 60 is cut by a plane perpendicular to the axial center direction of the screw 50.

A specific calculation method is as follows.

Height of isosceles triangle (P1-P3-P4): $A = P_{12}/2$

Basic angle of isosceles triangle (P1-P3-P4): $\alpha = \arcsin(A/D1)$

Base of the isosceles triangle (P1-P3-P4): $B = \cos\alpha \times D1 \times 2$

Area of isosceles triangle (P1-P3-P4): $C = A \times B/2$

Central angle of sector (P1-P3-P4): $\beta = \pi - 2 \times \alpha$

Area of sector (P1-P3-P4): $E = D1 \times D1 \times \pi \times \beta/2\pi$

Bottom area (cross-sectional area) of cylinder: $F = 2 \times D1 \times D1 \times \pi - 2 \times (E - C)$ Actual cylinder volume: $G = F \times L2$ (Strain Rate)

The strain rate was calculated based on Equation (II).

$$\text{Strain rate} = \text{rotation rate (min}^{-1}\text{) of screw} \times \text{radius (mm) of screw/width (mm) of narrow part inside cylinder} \quad \text{Equation (II)}$$

Rotation rate of screw

The rotation rate of the screw 50 was controlled by the motor 80 (driving unit) of the twin screw extruder 100 in FIG. 1.

Radius of screw

FIG. 2 is a diagram schematically showing the cross section of the cylinder 10 when a portion of the kneading disc 60 is cut by a plane perpendicular to the axial center direction of the screw 50.

For the radius of the screw, a radius r1 of a circle C1 shown in FIG. 2 was used.

This circle C1 means the largest circle among the orbits drawn by the end portion of the kneading disc 60 when the screw 50 rotates, in the cross section to which the axial direction of the screw 50 is perpendicular.

Width of narrow part ($D_{min}$)

Using FIG. 2, the narrowest portion (narrow part) inside the cylinder 10 was examined as follows.

First, in the cross section (FIG. 2) to which the axial direction of the screw 50 is perpendicular, while rotating the two kneading discs 60 with each other, the gap width therebetween was measured.

Subsequently, in the same cross section, the gap width between the kneading disc 60 and the inner wall of the cylinder 10 was measured.

As a result, it was found that the gap between the end portion in the major axis direction of the kneading disc 60 and the inner wall of the cylinder 10 was the narrowest narrow part. In the cross section, the circular orbit drawn by the end portion on the major axis side of the kneading disc 60 corresponds to the circle C1. The width $D_{min}$ (mm) of the narrow part obtained as above was used as the above-mentioned width of the narrow part inside the cylinder.

L2/D1

As shown in FIG. 1, the length L2 (mm) of the screw 50 and the internal radius D1 (mm) of the cylinder 10 were measured in the ejection direction. L2/D1 was calculated using the measured L2 and D1. The value of L2/D1 of the twin screw extruder 100 was 37.86.

L3/D1

As shown in FIG. 1, the width 1 (mm) of each disc of the kneading disc 60 was measured in the ejection direction. The total value of the lengths of the plurality of kneading discs 60 was calculated from the total value of the disc widths 1 and used as L3. L3/D1 was calculated using the measured L3 and D1.

The value of L3/D1 of the twin screw extruder 100 was 5, and (L3/D1)/(L2/D1) was 0.132.

Furthermore, when the number of discs of the kneading disc 60 was N, (L3/D1)/N was 0.143. The shift angles of the kneading discs 60 were as follows: an average value: 57.8 degrees, a maximum value: 90 degrees, and a minimum value: 45 degrees.

As shown in FIG. 2, the major axis and the minor axis of each of the kneading discs 60 were measured, and the average values of each thereof were denoted by D3 (mm) and d3 (mm). In this case, D3/d3 was 16.3.

Measurement of the dimensions of each configuration in the twin screw extruder 100 was performed using a caliper.

In Table 1, the volume-based ejection amount obtained above is denoted by X ($10^{-6} \cdot kg \cdot h^{-1} \cdot mm^{-3}$), and the strain rate obtained above is denoted by Y ($min^{-1}$).

In Table 1, X and Y are each represented by two significant figures.

TABLE 1

| | | Unit | Example 1 | Example 2 | Example 3 | Comparative Example 1 | Example 4 | Example 5 | Example 6 | Example 7 | Example 8 | Example 9 | Example 10 |
|---|---|---|---|---|---|---|---|---|---|---|---|---|---|
| Resin | Resin 1 | Parts by weight phr | 100 | 100 | 100 | 100 | 100 | 100 | 100 | 100 | 100 | 100 | 100 |
| | Resin 2 | | | | | | | | | | | | |
| Antioxidant and neutralizing agent | Antioxidant 1 | | 0.050 | 0.050 | 0.050 | 0.050 | 0.050 | 0.050 | 0.050 | 0.050 | 0.050 | 0.050 | 0.050 |
| | Antioxidant 2 | | 0.100 | 0.100 | 0.100 | 0.100 | 0.100 | 0.100 | 0.100 | 0.100 | 0.100 | 0.100 | 0.100 |
| | Neutralizing agent 1 | | 0.050 | 0.050 | 0.050 | 0.050 | 0.050 | 0.050 | 0.050 | 0.050 | 0.050 | 0.050 | 0.050 |
| Nucleating agent and transparent-izing agent | Particulate nucleating agent 1 | | 0.50 | 0.50 | 0.50 | 0.50 | 0.50 | 0.50 | 0.50 | 0.50 | 0.50 | 0.50 | 0.50 |
| | Particulate nucleating agent 2 | | | | | | | | | | | | |
| Filler | Filler 1 | | | | | | | | | | | | |
| Rubber | Rubber 1 | | | | | | | | | | | | |
| Kneading condition | Feed amount | kg/h | 7 | 14 | 28 | 42 | 7 | 28 | 42 | 7 | 14 | 28 | 42 |
| | Rotation rate of screw | min$^{-1}$ | 150 | 150 | 150 | 100 | 300 | 300 | 300 | 600 | 600 | 600 | 600 |
| | Extrusion temperature | °C | 230 | 230 | 230 | 230 | 230 | 230 | 230 | 230 | 230 | 230 | 230 |
| | Volume-based ejection amount | $10^{-6}$ · kg · h$^{-1}$ · mm$^{-3}$ | 4.9 | 9.9 | 19.7 | 29.6 | 4.9 | 19.7 | 29.6 | 4.9 | 9.9 | 19.7 | 29.7 |
| | Strain rate | min$^{-1}$ | 8250 | 8250 | 8250 | 5500 | 16500 | 16500 | 16500 | 33000 | 33000 | 33000 | 33000 |
| | X | | 4.9 | 9.9 | 2.0 ×10$^1$ | 3.0 ×10$^1$ | 4.9 | 2.0 × 10$^1$ | 3.0 × 10$^1$ | 4.9 | 9.9 | 2.0 × 10$^1$ | 3.0 × 10$^1$ |
| | Y | | 8.3 × 10$^3$ | 8.3 × 10$^3$ | 8.3 × 10 | 5.5 × 10$^3$ | 1.7 × 10$^4$ | 1.7 × 10$^4$ | 1.7 × 10$^4$ | 3.3 × 10$^4$ | 3.3 × 10$^4$ | 3.3 × 10$^4$ | 3.3 × 10$^4$ |
| | Y/X | | 1.7 × 10$^3$ | 8.4 × 10$^2$ | 4.2 × 10$^2$ | 1.8 × 10$^2$ | 3.5 × 10$^3$ | 8.5 × 10$^2$ | 5.7 × 10$^2$ | 6.7 × 10$^3$ | 3.3 × 10$^3$ | 1.7 × 10$^3$ | 1.1 × 10$^3$ |
| Performance | HAZE | % | 69 | 67 | 60 | — | 68 | 56 | 56 | 68 | 60 | 53 | 50 |
| | Bending modulus of elasticity | MPa | 1958 | 1996 | 2006 | | 1955 | 2037 | 2053 | 1961 | 1995 | 2063 | 2077 |
| Installation specification | Radius of screw | mm | 13.75 | 13.75 | 13.75 | 13.75 | 13.75 | 13.75 | 13.75 | 13.75 | 13.75 | 13.75 | 13.75 |
| | Width of narrow part | mm | 0.25 | 0.25 | 0.25 | 0.25 | 0.25 | 0.25 | 0.25 | 0.25 | 0.25 | 0.25 | 0.25 |
| | Actual cylinder capacity | $10^6$ · mm$^3$ | 1.42 | 1.42 | 1.42 | 1.42 | 1.42 | 1.42 | 1.42 | 1.42 | 1.42 | 1.42 | 1.42 |

| | | Example 11 | Example 12 | Example 13 | Comparative Example 2 | Example 14 | Example 15 | Example 16 | Example 17 | Example 18 | Example 19 | Example 20 |
|---|---|---|---|---|---|---|---|---|---|---|---|---|
| Resin | Resin 1 | 100 | 100 | 100 | 100 | 100 | 100 | 100 | 100 | 100 | 70 | 70 |
| | Resin 2 | | | | | | | | | | | |
| Antioxidant and neutralizing agent | Antioxidant 1 | 0.050 | 0.050 | 0.050 | 0.050 | 0.050 | 0.050 | 0.050 | 0.050 | 0.050 | 0.050 | 0.050 |
| | Antioxidant 2 | 0.100 | 0.100 | 0.100 | 0.100 | 0.100 | 0.100 | 0.100 | 0.100 | 0.100 | 0.100 | 0.100 |
| | Neutralizing agent 1 | 0.050 | 0.050 | 0.050 | 0.050 | 0.050 | 0.050 | 0.050 | 0.050 | 0.050 | 0.050 | 0.050 |
| Nucleating agent and transparent-izing agent | Particulate nucleating agent 1 | 0.50 | 0.50 | 0.50 | 0.50 | 0.50 | 0.50 | 0.50 | 0.05 | 0.05 | 0.50 | 0.50 |
| | Particulate nucleating agent 2 | | | | | | | | | | | |
| Filler | Filler 1 | | | | | | | | | | 10 | 10 |
| Rubber | Rubber 1 | | | | | | | | | | 20 | 20 |

TABLE 1-continued

| | | | | | | | | | | | | | |
|---|---|---|---|---|---|---|---|---|---|---|---|---|---|
| Kneading condition | Feed amount | 7 | 14 | 42 | 5 | 14 | 28 | 42 | 14 | 42 | 14 | 42 |
| | Rotation rate of screw | 900 | 900 | 900 | 1200 | 1200 | 1200 | 1200 | 300 | 300 | 300 | 300 |
| | Extrusion temperature | 230 | 230 | 230 | 230 | 230 | 230 | 230 | 230 | 230 | 230 | 230 |
| | Volume-based ejection amount | 29.6 | 4.9 | 9.9 | 29.6 | 3.5 | 9.9 | 19.7 | 29.6 | 9.9 | 29.6 | 29.6 |
| | Strain rate | 49500 | 49500 | 49500 | 66000 | 66000 | 66000 | 66000 | 16500 | 16500 | 16500 | 16500 |
| | X | 4.9 | 9.9 | $3.0 \times 10^1$ | 3.5 | 9.9 | $2.0 \times 10^1$ | $3.0 \times 10^1$ | 9.9 | $3.0 \times 10^1$ | 9.9 | $3.0 \times 10^1$ |
| | Y | $5.0 \times 10^4$ | $5.0 \times 10^4$ | $5.0 \times 10^4$ | $6.6 \times 10^4$ | $6.6 \times 10^4$ | $6.6 \times 10^4$ | $6.6 \times 10^4$ | $1.7 \times 10^4$ | $1.7 \times 10^4$ | $1.7 \times 10^4$ | $1.7 \times 10^4$ |
| | Y/X | $1.0 \times 10^4$ | $5.0 \times 10^3$ | $1.7 \times 10^3$ | $1.9 \times 10^4$ | $6.7 \times 10^3$ | $3.3 \times 10^3$ | $2.2 \times 10^3$ | $1.7 \times 10^3$ | $5.6 \times 10^2$ | $1.7 \times 10^3$ | $5.6 \times 10^2$ |
| Performance | HAZE | 69 | 59 | 50 | — | 60 | 55 | 52 | 68 | 62 | 100 | 100 |
| | Bending modulus of elasticity | 1959 | 2003 | 2080 | — | 2012 | 2065 | 2076 | 1981 | 2007 | 1208 | 1242 |
| Installation specification | Radius of screw | 13.75 | 13.75 | 13.75 | 13.75 | 13.75 | 13.75 | 13.75 | 13.75 | 13.75 | 13.75 | 13.75 |
| | Width of narrow part | 0.25 | 0.25 | 0.25 | 0.25 | 0.25 | 0.25 | 0.25 | 0.25 | 0.25 | 0.25 | 0.25 |
| | Actual cylinder capacity | 1.42 | 1.42 | 1.42 | 1.42 | 1.42 | 1.42 | 1.42 | 1.42 | 1.42 | 1.42 | 1.42 |

The methods for producing a resin composition and the obtained resin compositions of each of the examples and the comparative examples were evaluated based on the following evaluation items.

<Production Stability>

In the process of producing the resin composition of Comparative Example 1, vent-up, which is leakage of resin from an air vent hole (opening part 40), occurred, which made it unable to perform the process.

In the process of producing the resin composition of Comparative Example 2, die drool was generated at a die lip (tip end of the release part 30), which made it unable to stably obtain pellets.

On the other hand, in the methods for producing a resin composition of Examples 1 to 18, there were no occurrences of vent-up and die drool, which made it possible to stably produce pellets (resin compositions) by the extrusion process, and the results were better in the production stability as compared to Comparative Examples 1 and 2.

The obtained pellets were evaluated for the following evaluation items.

<HAZE: Transparency>

The obtained pellets were injection-molded by an injection molding machine (EC100-2A; manufactured by Toshiba Machine Co., Ltd.) under the conditions of the injection temperature of 200° C. and the die temperature of 50° C. to create a test piece with the dimensions of 60 mm×60 mm×1 mm.

The test piece was put in a thermostat at 23° C. immediately after molding and caused to stand for 48 hours. For the test piece taken out from the thermostat, the HAZE (%) was measured in accordance with JIS K 7136:2008. The measurement results are shown in Table 1.

<Bending Modulus of Elasticity>

The obtained pellets were injection-molded by an injection molding machine (EC100-2A; manufactured by Toshiba Machine Co. Ltd.) under the conditions of the injection temperature of 200° C. and the die temperature of 50° C. to create a test piece with the dimensions of 80 mm×10 mm×4 mm.

The test piece was put in a thermostat at 23° C. immediately after molding and caused to stand for 48 hours. For the test piece taken out from the thermostat, the bending modulus of elasticity (MPa) was measured in accordance with JIS K 7171: 2016. The measurement results are shown in Table 1.

Based on the results of the HAZE and the bending modulus of elasticity of Examples 1 to 3, 4 to 6, 7 to 10, 11 to 13, 14 to 16, 17, and 18, it was shown that by increasing the volume-based ejection amount with the strain rate set in a predetermined range in the kneading conditions, the bending modulus of elasticity can be increased while also reducing the HAZE of the resin composition.

(Examples 19 and 20)

In Example 19, a resin composition was obtained by performing the above-mentioned <Production of resin composition> by using the mixture of Example 4 and adopting the same kneading conditions as those of Example 4, except that 100 parts by weight of the resin 1 (polypropylene homopolymer) was changed to 70 parts by weight of the resin 2 (polypropylene block copolymer) as resin, and 10 parts by weight of the filler 1 (talc) and 20 parts by weight of the rubber 1 (ethylene-octene random copolymer) were added.

In Example 20, a resin composition was obtained in the same manner as in Example 19 except that the same kneading conditions as those in Example 6 were adopted.

As a result, in Examples 19 and 20, pellets (resin compositions) could be stably produced by the extrusion process. Furthermore, it was found that by increasing the volume-based ejection amount with the strain rate set in a predetermined range, the bending modulus of elasticity was increased in the obtained resin composition, but no fluctuation was observed in the transparency (HAZE) because of the reason that the resin was a block copolymer, and large amounts of the rubber and the filler were contained.

Based on the above descriptions, as compared to Comparative Examples 1 and 2, the methods for producing a resin composition of Examples 1 to 20 can realize the resin composition which has better production stability and which can improve the mechanical strength while also inhibiting a decrease in transparency.

This application claims priority on the basis of Japanese Patent Application No. 2020-006644 filed on Jan. 20, 2020, and incorporates all of its disclosures herein.

REFERENCE SIGNS LIST

10: cylinder
20: supply part (hopper)
30: release part
35: screw cap
40: opening part
50: screw
60: kneading disc (kneading section)
70: conveying section
80: motor
100: twin screw extruder

The invention claimed is:

1. A method for producing a resin composition, the method comprising:
   obtaining a resin composition by heating and melt-kneading a mixture containing a particulate nucleating agent in which a cumulative 50% particle size ($D_{50}$) in a volume-based particle size distribution is equal to or more than 0.1 μm and equal to or less than 300 μm and a thermoplastic resin using a twin screw extruder including, inside a cylinder, a screw having kneading discs,
   wherein the obtaining a resin composition includes extruding the mixture supplied into the twin screw extruder in an ejection direction under kneading conditions in which X and Y satisfy $4.0 \leq X$ in a range of $6.0 \times 10^3 \leq Y \leq 7.0 \times 10^4$ when a volume-based ejection amount represented by Equation (I) is denoted by X ($10^{-6} \cdot kg \cdot h^{-1} \cdot mm^{-3}$), and a strain rate represented by Equation (II) is denoted by Y ($min^{-1}$), volume-based ejection amount=ejection amount (kg/h) of twin screw extruder/internal capacity ($10^6 \cdot mm^3$) of cylinder, and [Equation (I)]

strain rate=rotation rate ($min^{-1}$) of screw×radius (mm) of screw/width (mm) of narrow part inside cylinder. [Equation (II)]

2. The method for producing a resin composition according to claim 1, wherein the kneading conditions in the extruding further satisfy $2.7 \times 10^2 \leq Y/X \leq 1.3 \times 10^4$.

3. The method for producing a resin composition according to claim 1, wherein the kneading conditions in the extruding further satisfy $X \leq 500$.

4. The method for producing a resin composition according to claim 1, wherein D1, L2, and L3 in the twin screw extruder satisfy $0.02 \leq (L3/D1)/(L2/D1) \leq 1.0$ when an internal radius of the cylinder is D1 (mm), a length of the screw in an axial center direction is L2, and a total value of lengths of the kneading discs in the axial center direction is L3.

5. The method for producing a resin composition according to claim 1, wherein the particulate nucleating agent contains a metal salt of an aromatic phosphoric acid ester represented by General Formula (1),

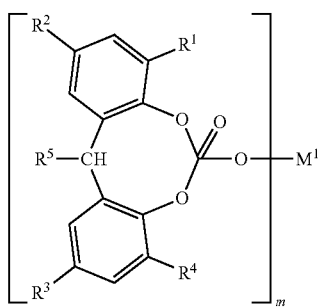

(1)

wherein in General Formula (1), $R^1$ to $R^4$ each independently represent a hydrogen atom or a linear or branched alkyl group having 1 to 9 carbon atoms, $R^5$ represents a hydrogen atom or an alkyl group having 1 to 4 carbon atoms, and m represents 1 or 2, provided that when m is 1, $M^1$ represents a hydrogen atom, $Al(OH)_2$, or an alkali metal atom, and when m is 2, $M^1$ represents a group 2 element, $Al(OH)$, or $Zn$).

6. The method for producing a resin composition according to claim 5, wherein the particulate nucleating agent contains a metal salt of an aromatic phosphoric acid ester represented by General Formula (1) in which $M^1$ is sodium and m is 1.

7. The method for producing a resin composition according to claim 1, wherein a heating temperature in the heating and melt-kneading is equal to or higher than 150° C. and equal to or lower than 300° C. in the obtaining a resin composition.

8. The method for producing a resin composition according to claim 1, wherein the thermoplastic resin contains a crystalline polymer.

9. The method for producing a resin composition according to claim 8, wherein the crystalline polymer contains includes a polyolefin-based polymer.

10. The method for producing a resin composition according to claim 1, wherein the mixture contains a filler.

11. The method for producing a resin composition according to claim 1, wherein the mixture contains a thermoplastic elastomer.

12. The method for producing a resin composition according to claim 1, wherein a content of the particulate nucleating agent in the mixture is equal to or more than 0.001 parts by weight and equal to or less than 10 parts by weight with respect to 100 parts by weight of the thermoplastic resin.

13. The method for producing a resin composition according to claim 1, wherein the resin composition is obtained in a pellet shape.

* * * * *

UNITED STATES PATENT AND TRADEMARK OFFICE
CERTIFICATE OF CORRECTION

PATENT NO. : 11,634,559 B2
APPLICATION NO. : 17/793528
DATED : April 25, 2023
INVENTOR(S) : R. Yokoyama et al.

It is certified that error appears in the above-identified patent and that said Letters Patent is hereby corrected as shown below:

In the Claims

Column 30, Lines 14-15 (Claim 9, Lines 2-3) please change "polymer contains includes" to
-- polymer includes --

Signed and Sealed this
Seventh Day of November, 2023

*Katherine Kelly Vidal*

Katherine Kelly Vidal
*Director of the United States Patent and Trademark Office*